United States Patent [19]

Miyata et al.

[11] Patent Number: 5,112,283
[45] Date of Patent: May 12, 1992

[54] CONTINUOUS SPEED-SHIFTING DEVICE

[75] Inventors: Hirofumi Miyata; Yutaka Furukawa, both of Kobe, Japan

[73] Assignee: Bando Chemical Industries, Ltd., Japan

[21] Appl. No.: 577,426

[22] Filed: Sep. 4, 1990

[30] Foreign Application Priority Data

Sep. 4, 1989 [JP] Japan .................. 1-22947

[51] Int. Cl.⁵ .............................. F16H 37/06
[52] U.S. Cl. ................................ 475/211; 475/218
[58] Field of Search ............ 475/210, 211, 218; 74/665 GE

[56] References Cited

U.S. PATENT DOCUMENTS 3,340,749  9/1967  Magg et al. .................. 475/211
4,936,165  6/1990  Doyle et al. .................. 475/211 X

FOREIGN PATENT DOCUMENTS 3326770   6/1984  Fed. Rep. of Germany .
59-65659  4/1984  Japan .................. 475/211
62-118159 5/1987  Japan .
2115091   9/1983  United Kingdom .

Primary Examiner—Allan D. Herrmann
Assistant Examiner—Benjamin Levi
Attorney, Agent, or Firm—Thompson, Hine and Flory

[57] ABSTRACT

The continuous speed-shifting device of the present invention is provided with the first, second and third rotary shafts, a differential gear mechanism having the first gear element connected to the third rotary shaft, a variable speed pulley mechanism which connects the second and the third rotary shafts speed-changeably by a belt, a driving power gear mechanism which connects the first rotary shaft to the second or the third gear element of the differential gear mechanism and a circulating power gear mechanism which connects the second rotary shaft to the third or the second gear element of the differential gear mechanism. According to switching of the advancing and the retreating, the first rotary shaft and the driving power gear mechanism or the second rotary shaft and the circulating power gear mechanism are connected or disconnected by the gear clutch. Large driving power transmitted from the first rotary shaft to the differential gear mechanism is passed through the gear mechanism but small circulating power returned to the first rotary shaft from the differential gear mechanism is always passed through the pulley mechanism. When the first rotary shaft and the driving power gear mechanism or the second rotary shaft and the circulating power gear mechanism are connected with each other by a gear clutch, rotation of the third rotary shaft is made zero to obtain a neutral state.

6 Claims, 5 Drawing Sheets

CONTINUOUS SPEED-SHIFTING DEVICE

BACKGROUND OF THE INVENTION

1. Field of the Invention

This invention relates to a belt type continuous speed-shifting device to be used for agricultural implements and other machines.

2. Description of the Prior Art

Conventionally, a belt type continuous speed-shifting device is composed of a variable speed pulley mechanism having variable speed pulleys supported on each of a pair of rotary shafts arranged in parallel with each other. Each of the above pulleys consists of a fixed sheave fixedly rotatably and axially non-slidably mounted on the rotary shaft and a movable sheave fixedly rotatably and axially slidably mounted on the rotary shaft, facing the fixed sheave. A V-shaped belt groove is formed between the fixed sheave and the movable sheave and a belt is trained between belt grooves of both variable speed pulleys. The speed change ratio between both rotary shafts is changed by varying an effective radius in relation to the V belt by moving each movable sheave in axial direction.

For example, the Japanese Patent Application Laying Open Gazette No. 62-118159 discloses a speed-shifting device which is provided with the above-mentioned variable speed pulley mechanism and a planetary gear mechanism (differential gear mechanism) as a gear mechanism for speed-shifting.

The above speed-shifting device with a variable speed pulley mechanism and a differential gear mechanism is high both in theoretical transmitting efficiency and actual transmitting efficiency. However, a problem with this device has such trouble that if an output shaft is made to rotate both in normal and reverse directions, driving power is applied to the belt of a pulley mechanism in one of the rotating directions and therefore too large force is applied to the belt at the time of high output, though it matters little at the time of low output. More particularly, in the closed-circuit type differential gearing, one of three gear elements of the differential gear mechanism is connected to an output shaft and by varying the number of revolutions of one of the remaining gear elements by regulating the speed change ratio at the pulley mechanism, the rotating direction and the speed of rotation are differentiated between said gear element and the remaining other gear elements and thus the rotating direction and the number of revolutions of the gear element on the output side, namely, the output shaft, are determined. At this time, however, both driving power and circulating power are generated as motive power and output power is equal to the driving power minus the circulating power. Which of the two power transmitting channels will become a driving power channel or a circulating power channel depends upon the angular speed of gear elements in the differential gear mechanism and the gear element of larger angular speed becomes the driving power channel. Since driving power is larger than circulating power, if it is tried to transmit small circulating power on the pulley side at the normal rotation, for example, at the reverse rotation the speed change ratio of the pulley is reversed and therefore large driving power is transmitted to the pulley side. This involves the problem of durability of the belt at the time of high output.

In order to solve the above problem, it is suggested to add a clutch and a normal and reverse rotation gear and by switching the normal and reverse rotation gear, small circulating power is always applied to the variable speed pulley mechanism. However, use of the normal and reverse rotation gear will require more space and will involve a cost increase.

The present invention has been made in view of the above and has for its object to provide a continuous speed-shifting device of high transmitting efficiency, low cost and space saving by applying small circulating power to the belt of the variable speed pulley mechanism only by a clutch, without using a normal and reverse rotation gear.

SUMMARY OF THE INVENTION

In order to attain the above object, a gear clutch is arranged between a differential gear mechanism and a variable speed pulley mechanism and also between a differential gear mechanism and an input shaft, and by switching these two gear clutches, small circulating power is always applied to the belt of the variable speed pulley mechanism.

Concretely, in the present invention first, second and third rotary shafts arranged in parallel with one another, a differential gear mechanism having first, second and third gear elements and a variable speed mechanism are provided. The first gear element of the differential gear mechanism is fixedly and rotatably mounted on the third rotary shaft. The variable speed pulley mechanism has first and second variable speed pulleys and a belt trained between both pulleys. The first and the second rotary shafts are connected speed-changeably to each other.

A first driving power gear mechanism which connects the first rotary shaft to the second gear element of the differential gear mechanism, a second driving power gear mechanism which connects the first rotary shaft to the third gear element of the differential gear mechanism, a first circulating power gear mechanism which connects the second rotary shaft to the third gear element of the differential gear mechanism and a second circulating power gear mechanism which connects the second rotary shaft to the second gear element of the differential gear mechanism are provided.

Further provided are a first and a second gear clutches. The first gear clutch connects (or disconnects) the first rotary shaft to (or from) the first or the second driving power gear mechanism. On the other hand, the second gear clutch connects (or disconnects) the second rotary shaft to (or from) the first or the second circulating power gear mechanism. By switching both gear clutches, the rotating direction of the first gear element of the differential gear mechanism is switched. It is so designed that by switching both gear clutches, the number of revolutions of the gear element which is connected to the driving power gear mechanism in the differential gear mechanism is kept more than that of the gear element connected to the circulating power gear mechanism and circulating power is transmitted to the variable speed pulley mechanism.

The first gear clutch makes the first rotary shaft connectable with both the first and the second driving power gear mechanisms. The second gear clutch makes the second rotary shaft connectable with the first and the second circulating power gear mechanisms. It is so designed that under such connection by both gear clutches, the number of revolutions of the first gear element of the differential gear mechanism becomes zero. The fixed sheave of the second variable speed pulley comprises a main body part fixedly and rotatably mounted on the second rotary shaft and a sheave part connected movably to the main body part through the medium of a screw part. A pulley clutch is interposed between the main body part and the sheave part for connecting and disconnecting them. When the first gear clutch connects the first rotary shaft to the first or the second driving power gear mechanism and the second gear clutch connects the second rotary shaft to the first or the second circulating power gear mechanism, the pulley clutch connects the main body part to the sheave part. On the other hand, when the first gear clutch connects the first rotary shaft to both of the first and the second driving power gear mechanisms and the second gear clutch connects the second rotary shaft to both of the first and the second circulating power gear mechanisms, connection of the sheave part to the main body part by the pulley clutch is released.

Each of the first and the second gear clutches has a sleeve which slides axially in mesh with spline tooth formed on the rotary shaft. A pair of gears (each gear is a part of a pair of gear mechanisms whose gear clutch connects rotary shafts) are supported relatively rotatably on rotary shafts on both sides of the sleeve. A spline tooth which is engageable with the sleeve is formed on each gear. By sliding the sleeve and meshing it with the spline tooth of the gear, the rotary shaft is connected to and disconnected from one or both of the gear mechanisms.

The pulley clutch is also provided with a cylindrical movable member which is movable in axial direction and has a spline tooth at its inner periphery. The spline tooth of the movable member is engageable with the spline tooth formed at the main body part and at the sheave part. By moving the movable member axially and by engaging its spline tooth with the spline tooth of the main body part and the sheave part, connection and disconnection between the main body part and the sheave part are done.

The differential gear mechanism is composed of a sun gear fixedly and rotatably mounted on the third rotary shaft, a plurality of pinions to mesh with the sun gear, a pinion carrier supported rotatably by the third rotary shaft and carrying a pinion and a planetary gear mechanism having a ring gear to mesh with the pinion at its inner periphery.

BRIEF DESCRIPTION OF THE DRAWINGS

The nature and advantage of the present invention will be understood more clearly from the following description made with reference to the accompanying drawings, in which:

FIG. 1 to FIG. 5 show an embodiment of the present invention, of which

DETAILED DESCRIPTION OF THE INVENTION

A description is made below of an embodiment of the present invention, with reference to the accompanying drawings.

Figure 1:
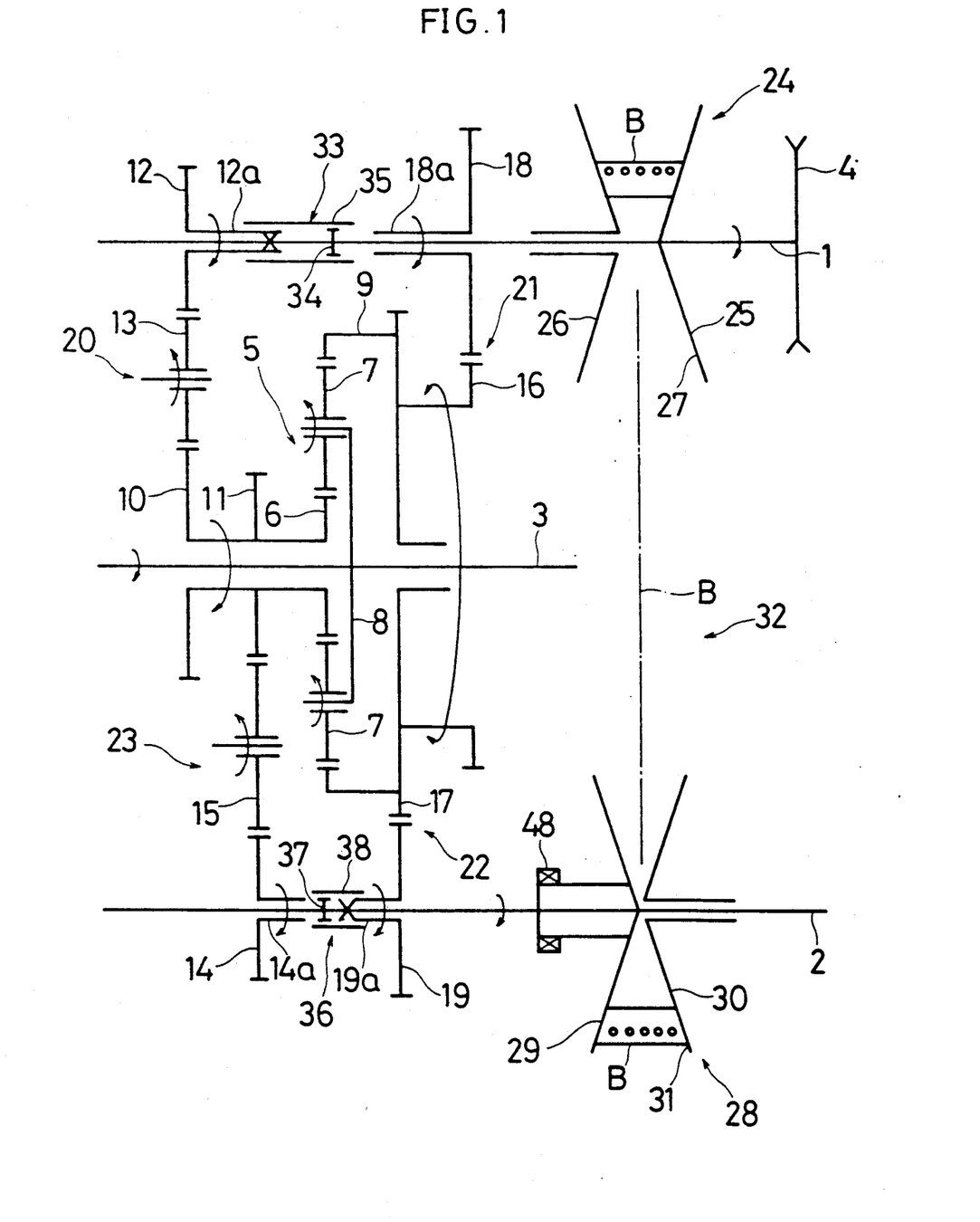
FIG. 1 is a skeleton drawing, showing the high speed advancing state of the continuous speed-shifting device.
Figure 2:
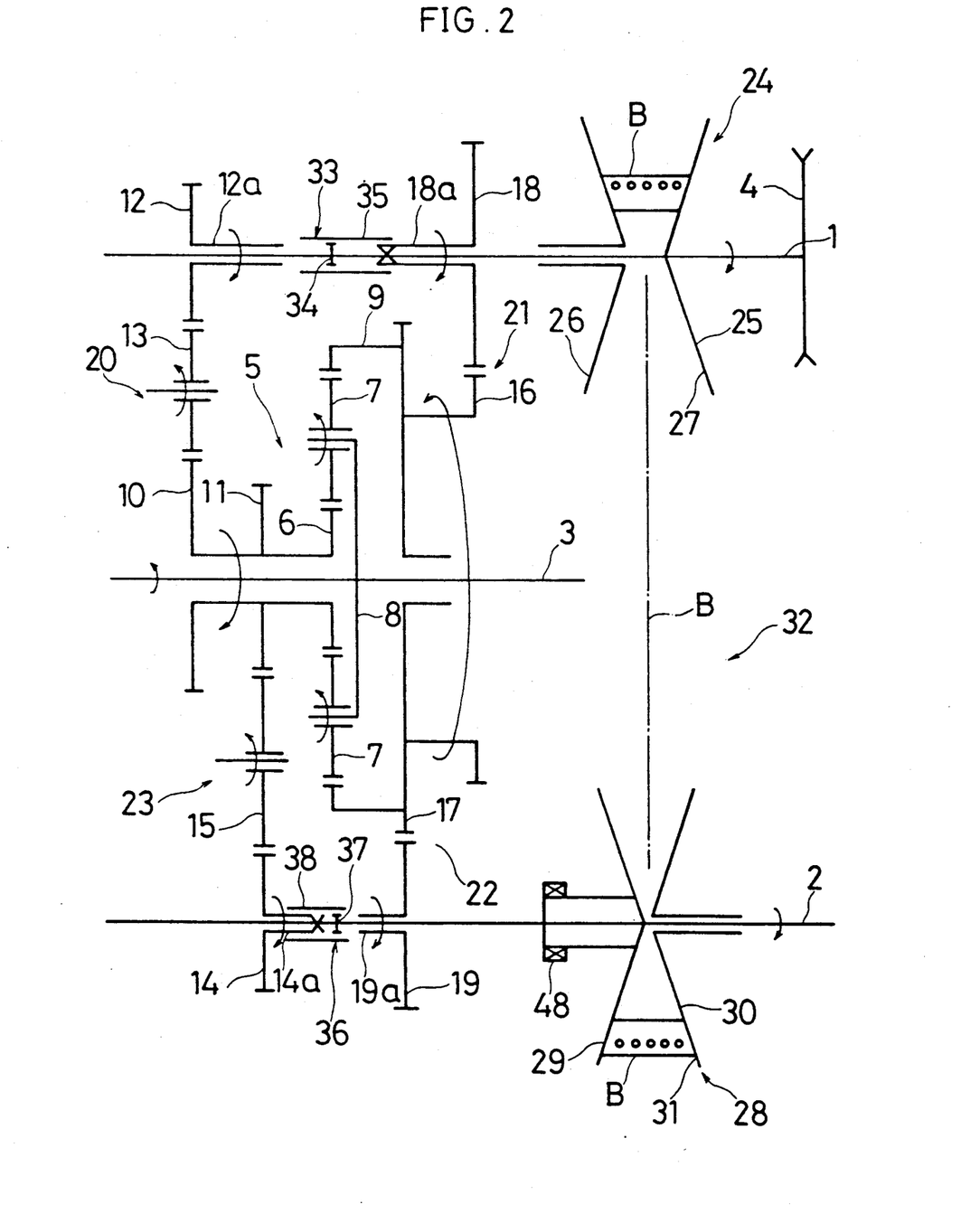
FIG. 2 is a skeleton drawing, showing the high speed retreating state of the continuous speed-shifting device.
Figure 3:
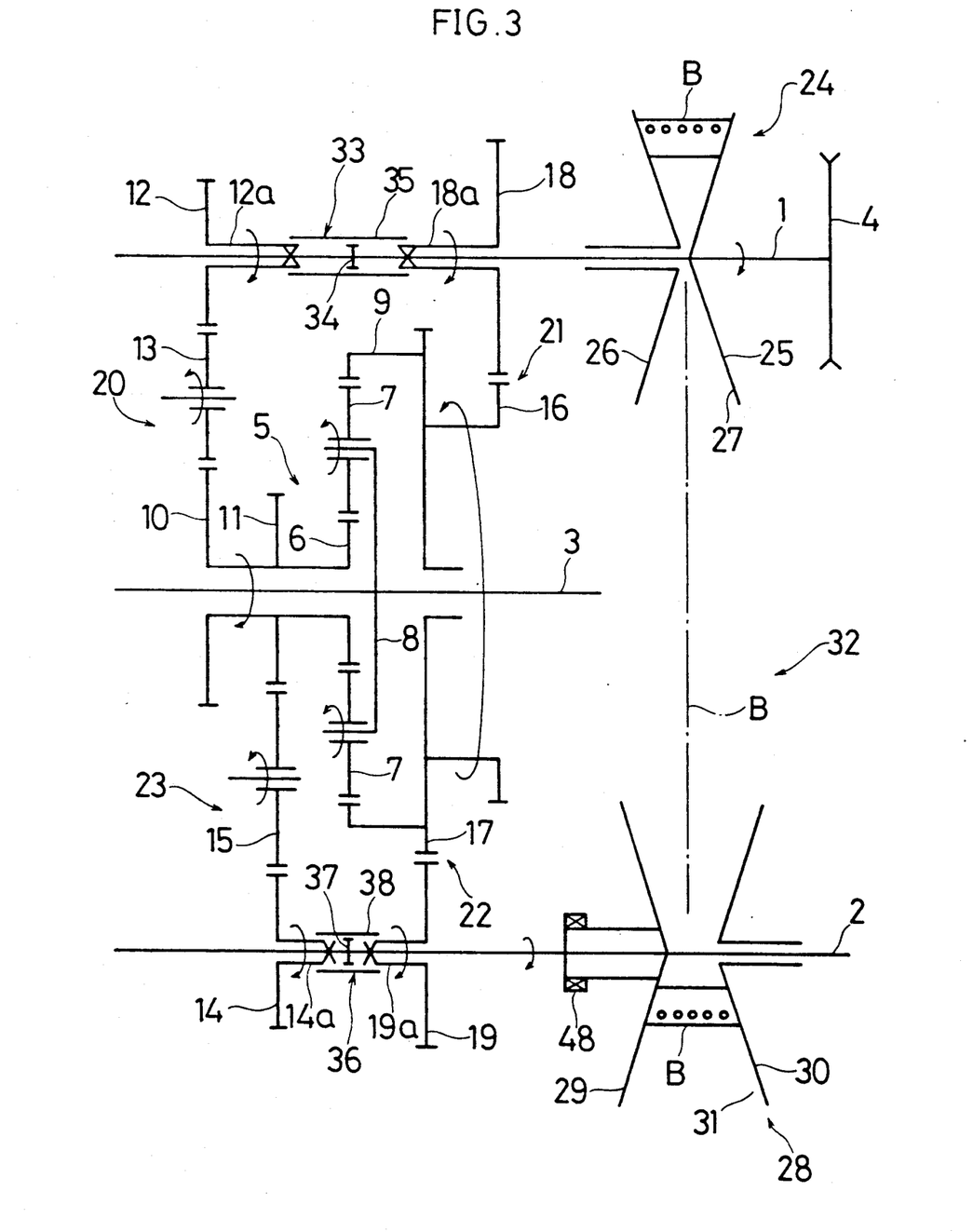
FIG. 3 is a skeleton drawing, showing the neutral state of the continuous speed-shifting device.

FIG. 1-FIG. 3 show the overall composition of the continuous speed-shifting device of the present invention. In the drawings, reference numerals 1, 2 and 3 designate a first, a second and a third rotary shafts respectively arranged in parallel with one another. These rotary shafts 1, 2, 3 are supported rotatably by a casing (not shown in the drawing). The first rotary shaft 1, the second rotary shaft 2 and the third rotary shaft compose an input shaft, an intermediate shaft and an output shaft respectively, namely, an input pulley 4 is fitted rotatably to the right end of the first rotary shaft and this input pulley 4 is connected to an engine (not shown in the drawing).

A planetary gear mechansim 5 composing a differential gear mechanism is supported rotatably at the left end of the third rotary shaft 3 as an output shaft. This planetary gear mechanism 5 is provided with a sun gear 6 (with 30 teeth) as the second gear element fixedly and rotatably mounted on the third rotary shaft 3, a plurality of pinions 7 (each with 15 teeth) to mesh with the sun gear 6, a pinion carrier 8 as the first gear element supported rotatably by the third rotary shaft 3 and carrying the pinions 7 and a ring gear 9 (with 60 teeth) as the third gear element arranged at the outermost periphery and meshing with the pinions 7 at its inner periphery. A gear 10 (with 18 teeth) and a gear 11 (with 24 teeth) are fixed rotatably to the sun gear 6, and the gear 10 is connected to a gear 12 (with 27 teeth) rotatably supported by the first rotary shaft 1 through the medium of an intermediate gear 13 (with 19 teeth). On the other hand, the gear 11 is connected to a gear 14 supported rotatably by the second rotary shaft 2 as an intermediate shaft, through the medium of an intermediate gear 15 (with 19 teeth). A gear 16 (with 56 teeth) and a gear 17 (with 64 teeth) are fixed to the ring gear 9. The gear 16 meshes with a gear 18 (with 42 teeth) rotatably supported by the first rotary shaft 1 and facing the gear 12. Similarly, the gear 17 meshes with a gear 19 (with 24 teeth) supported rotatably by the second rotary shaft 2 and facing the gear 14. Gears 10, 12 and 13 compose a first driving power gear mechanism 20 which connects the first rotary shaft 1 to the sun gear 6 (the second gear element) of the planetary gear mechanism 5, through the medium of the first gear clutch 33 (to be described later). Gears 16 and 18 compose a second driving power gear mechanism 21 which connects the first rotary shaft 1 to the ring gear 9 (third gear element) through the medium of the clutch 33. Gears 17 and 19 compose a first circulating power gear mechanism 22 which connects the second rotary shaft 2 to the ring gear 9 through the medium of the second gear clutch 36 (to be described later). Gears 11, 14 and 15 compose the second circulating power gear mechanism 23 which connects a second rotary shaft 2 to the sun gear 6 through the medium of the clutch 36.

Figure 5:
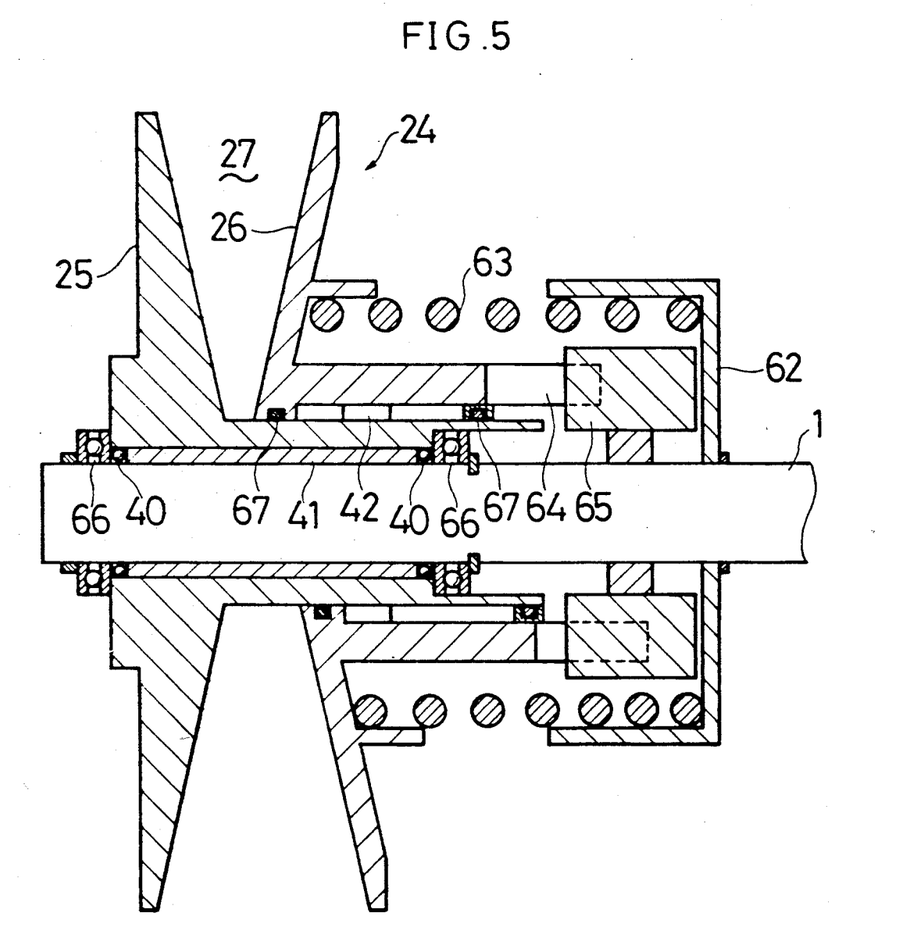
FIG. 5 is a cross section, on an enlarged scale, of the first variable speed pulley, showing the cases where the pitch diameter is large (on the upper side) and where the pitch diameter is small (on the lower side).

A first variable speed pulley 24 is rotatably and non-slidably mounted on the first rotary shaft 1 at about the right end thereof. This variable speed pulley 24, as shown in FIG. 5 on an enlarged scale, is provided with a fixed sheave 25 supported on the first rotary shaft 1 through the medium of radial bearings 40 and a bushing 41 and a movable sheave supported movably in relation to said fixed sheave. Both sheaves 25, 26 are connected with each other by a key 42. A belt groove 27 of V-shape in cross section is formed between both sheaves 25, 26 and by axial movement of the movable sheave 26, the radius (pitch diameter) of the belt groove 27 varies.

A second variable speed pulley 28 is supported rotatably and non-slidably by the second rotary shaft 2, corresponding to the first variable pulley 24 of the first rotary shaft 1. This variable speed pulley 28 is provided with a fixed sheave 29 mounted rotatably on the second rotary shaft 2 and a movable sheave 30 supported movably in relation to the fixed sheave 29. A belt groove 31, substantially V-shaped in cross section, is formed between both sheaves 29, 30 and by axial movement of the movable sheave 30, radius (pitch diameter) of the belt groove 31 varies. A V-belt B (FIG. 1) is trained between the belt grooves 27, 31. The first variable speed pulley 24, the second variable speed pulley 28 and the belt B compose a variable speed pulley mechanism 32.

The first gear clutch 33 is arranged at the first rotary shaft 1 between gears 12 and 18. This gear clutch 33 has a sleeve 35 which always meshes with a spline tooth 34 fixed to the first rotary shaft 1 between gears 12 and 18 and slides axially. The sleeve 35 is engageable with the spline tooth (not shown in the drawing) formed on the outer periphery of the boss part 12a and 18a. By sliding the sleeve 35 and meshing it with the spline tooth of the gears 12, 18 the first rotary shaft 1 is connected with and disconnected from the first or the second driving power gear mechanism (20 or 21) or both mechanisms (20 and 21). When the sleeve 35 is positioned on the left side (in the drawing), the first rotary shaft 1 is connected only to the gear 12 of the first driving power gear mechanism 20, but when the sleeve 35 is positioned on the right side (in the drawing), the rotary shaft 1 is connected only to the gear 18 of the second driving power gear mechanism 21. When the sleeve 35 is positioned at the intermediate part (in the drawing), the rotary shaft 1 is connected to both of the gears 12, 18 of the first and the second driving power gear mechanisms 20, 21.

The second rotary shaft 2 is provided with a second gear clutch 36 (similar in construction to the first gear clutch 35). More particularly, the second gear clutch 36 has a sleeve 38 which slides axially in mesh with a spline tooth 37 fixed to the rotary shaft 2 between gears 14 and 19. The sleeve 38 is engageable with the spline tooth (not shown in the drawings) formed at the outer periphery of the boss parts 14a, 19a of the gears 14, 19. By sliding the sleeve 38 and meshing it with the spline tooth of the gears 14, 19, the second rotary shaft 2 is connected with or disconnected from the first or the second circulating power gear mechanism (22 or 23) or both of them. When the sleeve 38 is positioned on the right side in the drawing, the second rotary shaft 2 is connected only to open gear 19 of the first circulating power gear mechanism 22. When the sleeve 38 is positioned on the left side (in the drawing), the second rotary shaft 2 is connected only to the gear 14 of the second circulating power gear mechanism 23. When the sleeve 38 is positioned at the intermediate part (in the drawing), the second rotary shaft 2 is connected to both of the gears 19 and 14 of the first and the second circulating power gear mechanisms 22, 23.

It is so designed that by setting the gear ratio of the planetary gear mechanism 5 and the speed change ratio of the variable speed pulley mechanism 32, the following state can be obtained, namely, with switching of the first and the second gear clutches 33, 36, the rotating direction of the pinion carrier 8 of the planetary gear mechanism 5 is switched and the number of revolutions of the sun gear 6 (or the ring gear 9) connected to the driving power gear mechanism 20 is kept higher than that of the ring gear 9 (or the sun gear 6) connected to the circulating power gear mechanism 22 (or 23) and therefore circulating power is transmitted to the variable speed pulley 32. When the first gear clutch 33 connects the first rotary shaft 1 to both of the first and the second driving power gear mechanism 20, 21 and the second gear clutch 36 connects the second rotary shaft 2 to both of the first and the second circulating power gear mechanisms 22, 23, the number of revolutions of the pinion carrier 8 (the third rotary shaft 3) becomes zero.

Figure 4:
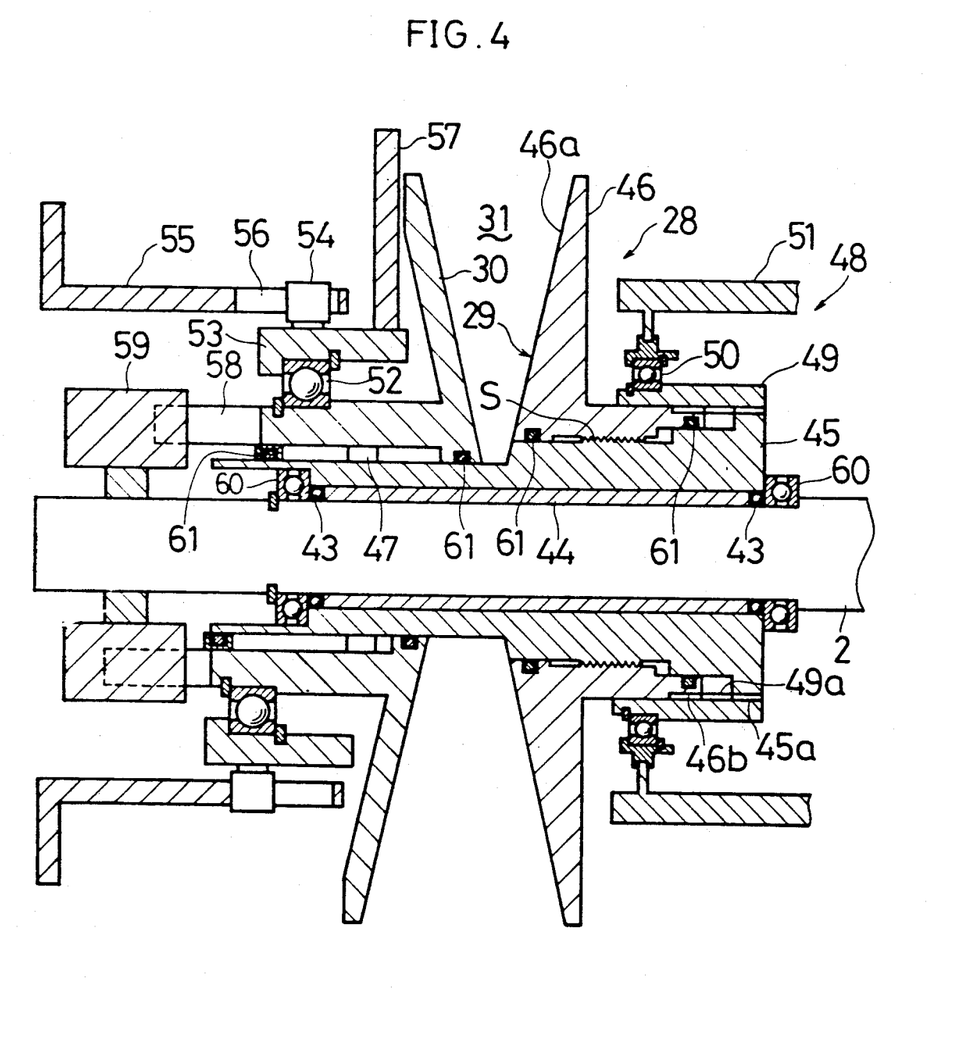
FIG. 4 is a cross section, on an enlarged scale, of the second variable speed pulley, showing the cases where the pitch diameter is large (on the upper side) and where the pitch diameter is small (on the lower side)

As illustrated in detail in FIG. 4, the fixed sheave 29 of the second variable speed pulley 28 comprises a cylindrical main body part 45 and a sheave part 46 which is connected by screwing to the cylindrical main body part 45 and has a sheave face 46a which makes contact with the V belt B. The main body part 45 and the sheave part 46 are connected to each other through the medium of a pulley clutch 48. The movable sheave 30 is connected to the fixed sheave 29 in such a fashion that it is slidable only in axial direction.

The pulley clutch 48 comprises a cylindrical movable member 49 having at its inner periphery a spline tooth 49a which is engageable with the spline tooth 45a, 46b, each formed at the main body part 45 and the sheave part 46, and a connecting rod 51 relatively rotatably and fixedly slidably mounted on the movable member 49 through the medium of a bearing 50. By moving the movable member 49 axially by the connecting rod 51 and by engaging the spline tooth 45a of the main body part 45 with the spline tooth 46b of the sheave part 46, connection and disconnection of the main body part 45 and the sheave part 46 are done.

In the state where connection of the main body part 45 and the sheave part 46 is released by the pulley clutch 48, if rotating torque is given to the sheave part 46 from the V belt B, both parts 45, 46 are connected with each other through the medium of the screw part S so that the sheave part 46 is made movable in axial direction.

When the first gear clutch 33 connects the first rotary shaft 1 to the gears 12, 18 of both driving power gear mechanisms 20, 21 and the second gear clutch 36 connects the second rotary shaft 2 to the gears 19, 14 of both circulating power gear mechanisms 22, 23, the device is put in a neutral state and simultaneously in a disconnected state, but when the device is put in a non-neutral state, it is put in a connected state.

A cam follower base 53 is fitted rotatably to the movable sheave 30 through the medium of a bearing 52. A cam follower 54 of the cam follower base 53 is disposed in a cam groove 56 of a cylindrical operating cam 55 fixed to the specified position. By moving an operating lever 57 fitted to the cam follower base 53 around the rotary shaft 2, the movable sheave 30 can easily be moved in axial direction by small operating power.

A torque cam 58 is formed at a rear end portion of the movable sheave 30 and inside the operating cam 55. The torque cam 58 is fitted in such a fashion that it makes contact with another cam follower 59 which rotates with the second rotary shaft 2, namely, even if load is applied to the device, no big change in operating power occurs due to the torque cam 58. Thus, torque cam 58 performs its duties as assistance to the speed-shifting operation. Generally, at the second variable speed pulley 28 on the driving side requires thrust which is two to three times as large as that required at the first variable speed pulley 24 on the driven side and therefore, the cam angle of the torque cam 58 is 0.5-5 times as large as that of the torque cam 64 of the first variable speed pulley 24, namely 10°-175°. In FIG. 4, reference numerals 60 and 61 designate a thrust bearing and an O-ring respectively.

As shown in FIG. 5, a spring 63 is interposed between the movable sheave 26 of the first variable speed pulley 24 and a spring receiver 62 fixed to the first rotary shaft 1. By this spring 63, the movable sheave 26 is biased toward the fixed sheave 26 side at all times.

The torque cam 64 is formed at the rear end portion of the movable sheave 26 and a cam follower 65 fitted to the first rotary shaft 1 is put on the torque cam 64. In FIG. 5, reference numerals 66 and 67 designate a thrust bearing and an O-ring respectively.

An explanation is made below about the action of the above embodiment.

As shown in FIG. 1, when the speed-shifting device advances, the sleeve 35 of the first gear clutch 33 is positioned on the left side and connects the first rotary shaft 1 with the gear 12. The first rotary shaft 1 and the sun gear 6 of the planetary gear mechanism 5 is connected with each other through the medium of the first driving power gear mechanism 20. Also, the sleeve 38 of the second gear clutch 36 is positioned on the right side and connects the second rotary shaft 2 to the gear 19. The second rotary shaft 2 and the ring gear 9 of the planetary gear mechanism 5 are connected with each other, through the medium of the first circulating power gear mechanism 22. In this state, rotation of the first rotary shaft 1 is transmitted to the sun gear 6 of the planetary gear mechanism 5 through the medium of the first gear clutch 33 and the first driving power gear mechanism 20. This rotation is also transmitted to the variable speed mechanism 32, where it is changed in speed and is further transmitted to the ring gear 9 of the planetary gear mechanism 5 via the second rotary shaft 2, the second gear clutch 36 and the first circulating power gear mechanism 22. By the operation of an operating lever 57, when the pitch diameter of the first variable speed pulley 24 is made different than that of the second variable speed pulley 28, a difference in rotation occurs between the sun gear 6 and the ring gear 9. By this difference in rotation, rotation in one direction is generated at the pinion carrier 8 of the planetary gear mechanism 5 and results in the advancing state.

By varying the speed change ratio of the variable speed mechanism 32, the rotating speed of the pinion carrier 8 of the planetary gear mechanism, namely, the speed of revolution of the third rotary shaft 3, can be regulated or the advancing speed can be increased or decreased as desired.

In the number of teeth of various gears stated above, suppose the first rotary shaft 1 is rotated in anticlockwise direction (as seen from the right side of the figure) at 2,000 r.p.m. (speed of revolution) and 5 kg.m torque, the gear 12 of the first driving power gear mechanism 20 rotates at 2,000 r.p.m. and 75 kg.m torque in the same direction (anticlockwise direction as seen from the right side in the figure) and the sun gear 6 of the planetary gear mechanism 5 rotates at 3,000 r.p.m. and 4.5 kg.m torque in the same direction. If the speed change ratio of the variable speed pulley 32 is "2", the second variable speed pulley 28 rotates in the same direction at 1,000 r.p.m. and 3.3 kg.m torque but the ring gear 9 of the planetary gear mechanism 5 rotates in reverse direction (clockwise direction as seen from the right side in the figure) at the 375 r.p.m. and 8.9 kg.m torque. Therefore, the pinion carrier 8 of the planetary gear mechanism 5 and the third rotary shaft 3 rotate in the same direction at 750 r.p.m. and 13.4 kg.m torque. The gear 18 of the second driving power gear mechanism 21 and the gear 14 of the second circulating power gear mechanism 23, both being free, rotate at 500 r.p.m. and at 4,000 r.p.m. respectively in the same direction.

In the above state, circulation of power (a part of power returns to the first rotary shaft from the planetary gear mechanism 5 occurs. The number of revolutions of the sun gear 6 connected to the driving power gear mechanism 20 becomes more than that of the ring gear 9 connected to the circulating power gear mechanism 22, namely, Angular speed of the sun gear 6 > angular speed of the ring gear 9

(Angular speed = $2\pi$ · no. of revolutions)

Therefore, the above circulating power does not pass through the first driving power gear mechanism 20 side but is transmitted to the first rotary shaft 1 via the ring gear 9 of the planetary gear mechanism 5, the first circulating power gear mechanism 22, the second gear clutch 36, the third rotary shaft 3 and the variable speed pulley mechanism 32.

Contrary to the above, in the retreating state the sleeve 35 of the first gear clutch 33 is positioned toward the right side and connects the first rotary shaft 1 to the gear 18, as shown in FIG. 2. The first rotary shaft 1 and the ring gear 9 of the planetary gear mechanism 5 are connected to each other through the medium of the second driving power gear mechanism 21. The sleeve 38 of the second gear clutch 36 is positioned toward the left side and connects the second rotary shaft 2 to the gear 14. The second rotary shaft and the sun gear 6 are connected to each other through the medium of the second circulating power gear mechanism 23. In this state, rotation of the first rotary shaft 1 is transmitted to the ring gear 9 of the planetary gear mechanism 5 through the medium of the first gear clutch 33 and the second driving power gear mechanism 23. Also, the rotation of the first rotary shaft 1 is transmitted to the sun gear 6 of the planetary gear mechanism 5 through the medium of the variable speed mechanism 32, the second rotary shaft 2, the second gear clutch 36 and the second circulating power gear mechanism 23. When the pitch diameter of the first variable speed pulley 24 of the variable speed pulley mechanism 32 is made smaller than that of the second variable speed pulley 28, difference in rotation occurs between the sun gear 6 and the ring gear 9, whereby the rotation in the other direction occurs at the pinion carrier 8 and results in the retreating state. By changing the speed change ratio of the variable speed mechanism 32, the retreating speed can be increased or decreased as desired.

In the above case where the first rotary shaft 1 is rotated in anticlockwise direction (as seen from the right side in the figure) at 2,000 r.p.m. and at 5 Kg.m torque, the gear 18 of the second driving power gear mechanism 21 rotates in the same direction at 2,000 r.p.m. and 6.67 Kg.m. torque and the ring gear 9 of the planetary gear mechanism 5 rotates in reverse direction at 1,500 r.p.m. and 8.9 kg.m torque. If the speed change ratio of the variable speed pulley mechanism 32 is "2", the second variable speed pulley 28 rotates in the same direction at 1,000 r.p.m. and 3.37 kg.m torque. The gear 14 of the second circulating power gear mechanism 23 rotates at 1,000 r.p.m. and the sun gear 6 of the planetary gear mechanism 5 rotates at 750 r.p.m. and 4.5 kg.m torque, each in the same direction. Therefore, the pinion carrier 8 of the planetary gear mechanism 5 and the third rotary shaft 6 rotate at 750 r.p.m. and 13.4 kg.m torque in reverse direction. The gear 12 of the first driving power gear mechanism 20 rotates at 500 r.p.m. and the gear 19 of the first circulating power gear mechanism 22 rotates at 4,000 r.p.m., both being free, in the same direction.

In the above case, circulation of power is generated from the planetary gear mechanism 5. The number of revolutions of the ring gear 9 becomes higher than that of the sun gear 6, namely, Angular speed of the sun gear 6 < angular speed of the ring gear 9.

Therefore, the circulating power does not pass through the second driving power gear mechanism 21 but is transmitted to the first rotary shaft 1 via the sun gear 6 of the planetary gear mechanism 5, second circulating power gear mechanism 23, the second gear clutch 36, the third rotary shaft 3 and the variable speed pulley mechanism 32.

Thus, in both cases of advancing and retreating, circulating power which is smaller than driving power is always transmitted to the variable speed pulley mechanism 32 and therefore, even at the time of high output, transmitting load on the belt B of the variable speed pulley mechanism 32 can be kept small and durability of the belt B can be improved.

Since transmission of circulating power stated above is carried out by switching of the two gear clutches 33, 36, installation space can be reduced (as compared with the case of using normal and reverse rotation gears) and the size of the speed-shifting device can be made compact. Moreover, the device according to the present invention can be manufactured at low cost by using cheap gear clutches 33, 36.

When the speed-shifting device is put in a neutral state, the first gear clutch 33 is positioned at the intermediate part as shown in FIG. 3, whereby the first rotary shaft 1 is connected to the sun gear 6 of the planetary gear mechanism 5 through the medium of the first driving power gear mechanism 20 through the medium of the first driving power gear mechanism 20 and also is connected to the ring gear 9 through the medium of the second driving power gear mechanism 21. The second gear clutch 36 is positioned at the intermediate part, whereby the second rotary shaft 2 is connected to the ring gear 9 through the medium of the first circulating power gear mechanism 22 and also is connected to the sun gear 6 through the medium of the second driving power gear mechanism 21. The speed change ratio of the variable speed pulley mechanism 32 is adjusted to "0.5" so as to conform it to the speed change ratio between the sun gear 6 and the ring gear 9 of the planetary gear mechanism 5. In this state, the sun gear 6 and the ring gear 9 of the planetary gear mechanism 5 are reverse to each other in rotating direction but are the same in the number of revolutions, and the pinion carrier 8 and the third rotary shaft 3 do not rotate. Thus, the device is put in a neutral state.

In the above example, the ring gear 9 of the planetary gear mechanism 5 rotates at 1,500 r.p.m. in reverse direction. Since the speed change ratio of the variable speed pulley mechanism 32 is "0.5", the second variable speed pulley 28 rotates at 4,000 r.p.m. and the sun gear 6 of the planetary gear mechanism 5 rotates at 600 r.p.m. in the same direction. Thus, the number of revolutions of the third rotary shaft 3 becomes 0 r.p.m.

At this time, the pulley clutch 48 is disconnected and connection between the main body part 45 and the sheave part 46 of the fixed sheave 29 of the second variable speed pulley 28 is released. The sheave part 46 moves in relation to the main body part 45 through the medium of the screw part S and a genuine neutral position, free from load on the belt B, is obtained. Thus, the neutral state where r.p.m. of the rotary shaft 3 on output side is zero can be obtained by simple construction.

In the neutral state, both of the first and the second rotary shafts 1, 2 rotate at large rotary torque and at the specified speed change ratio. At this time, no load is applied so long as the speed change ratio of the variable speed pulley is rotating at the same ratio as the gear speed change ratio, but big load is applied to the V belt B only if any difference occurs between both speed change ratioes. In the above device, so long as the gear clutches 33, 36 are connecting the first and the second rotary shafts 1, 2 to the power gear mechanisms 20, 21, 22, 23, the main body part 45 and the sheave part 46 are kept connected through the medium of the screw part S and therefore rotating torque which works on the sheave part 46 and the sheave surface 46a is converted into force moving in axial direction and thus no load state is obtained and in its turn stabilization is obtained. More particularly, in the case where the gear speed change ratio conforms to the belt speed change ratio, no torque is applied to the V belt B and the screw part S. Thus, the sheave part 46 does not move in any direction.

In the case where the pitch diameter of the first variable speed pulley 24 is smaller than the set pitch diameter, the pitch diameter of the second variable speed pulley 28 is larger than the set value. Therefore, while the first variable speed pulley 24 generates force to rotate the second variable speed pulley 28 faster, the second variable speed pulley 28 generates force to rotate the first variable speed pulley 24 slower, namely, the tension side span of the V belt B becomes the input side of the second variable speed pulley 28 and the second variable speed pulley 28 receives force to rotate slower than the second rotary shaft 2 from the V belt B. At this time, if the screw part S of the sheave part 46 is made right screw, the belt pitch diameter of the second variable speed pulley 28 is raised by rotating torque and raising is stopped when the gear speed change ratio conforms to the belt speed change ratio.

In the case where the pitch diameter of the first variable speed pulley 24 is larger than the set pitch diameter, the state contrary to the above occurs, namely, the tension side span of the belt B becomes the output side of the second variable speed pulley 28 and the sheave part 46 receives force to rotate faster than the second rotary shaft 2 from the V belt B. Therefore, the sheave part 46 moves in the direction of making the pitch diameter of the V belt B smaller until the gear speed change ratio conforms to the belt speed change ratio.

According to the continuous speed-shifting device of the present invention, circulating power can always be transmitted to the pulley mechanism by simple construction utilizing gear clutches and compactness and cost reduction of the continuous speed-shifting device of high transmitting efficiency, with combination of the pulley mechanism and the differential gear mechanism, can be planned. If the speed-shifting device is set at the neutral position, discrepancy in belt pitch is regulated automatically and it is put in a genuine neutral state. Even if wear of the V belt and position slippage of the speed shifting lever take place, no overload is applied to the V belt and service life of the belt can be improved. Thus, this device has high industrial utility value.

What is claimed is:

1. A continuous speed-shifting device comprising:
   first, second and third rotary shafts arranged in parallel with one another;
   a differential gear mechanism having first, second and third gear elements, of which the first gear element is fixedly mounted on the third rotary shaft for rotation thereon;
   a variable speed pulley mechanism having first and second variable pulleys fitted to the first and the second rotary shafts, respectively, each of said pulleys including a fixed sheave fixedly mounted on an associated one of said shafts and a movable sheave axially slidably mounted on an associated one of said shafts and facing said fixed sheave, and a belt trained between both of said pulleys, thereby connecting the first and the second rotary shafts speed-changeably;
   a first driving power gear mechanism connecting the first rotary shaft to the second gear element of the differential gear mechanism;
   a second driving power gear mechanism connecting the first rotary shaft to the third gear element of the differential gear mechanism;
   a first circulating power gear mechanism which connects the second rotary shaft to the third gear element of the differential gear mechanism;
   a second circulating power gear mechanism which connects the second rotary shaft to the second gear element of the differential gear mechanism;
   a first gear clutch positionable to connect the first rotary shaft to the first or the second driving power gear mechanism, or disconnect the first rotary shaft from the first or the second driving power gear mechanism; and
   a second gear clutch positionable to connect the second rotary shaft to the first or the second circulating power gear mechanism, or disconnect the second rotary shaft from the first or the second circulating power gear mechanism;
   whereby rotating direction of the first gear element of the differential gear mechanism is switched by positioning the first and second gear clutches and the rotational speed of the second or third gear element of the differential gear mechanism connected alternately to the first or second driving power gear mechanism, respectively, is kept higher than that of the third or second gear element connected alternately to the first or second circulating power gear mechanism, respectively, and circulating power is transmitted to the variable speed pulley mechanism.

2. A continuous speed-shifting device as defined in claim 1, wherein the first gear clutch can connect the first rotary shaft to both of the first and the second driving power gear mechanisms simultaneously, the second gear clutch can connect the second rotary shaft to both of the first and the second circulating power gear mechanisms simultaneously and in the state of simultaneous connection by both clutches number of revolutions of the first gear element of the differential gear mechanism becomes zero.

3. A continuous speed-shifting device as defined in claim 2, wherein the fixed sheave of the second variable pulley comprises a main body part fixedly mounted on the second rotary shaft and a sheave part mounted slidably in an axial direction to the main body part through the medium of a screw part, a pulley clutch interposed between the main body part and sheave part for connecting and disconnecting the main body and sheave parts, the pulley clutch connecting the main body part with the sheave part when the first gear clutch connects the first rotary shaft to the first or the second driving power gear mechanism and the second gear clutch connects the second rotary shaft to the first or the second circulating power gear mechanism but releases connection of the main body part and the sheave part when the first gear clutch connects the first rotary shaft to both of the first and the second driving power gear mechanisms and the second gear clutch connects the second rotary shaft to both of the first and the second circulating power gear mechanisms.

4. A continuous speed-shifting device as defined in claim 2, wherein each of the first and the second gear clutches has a sleeve which slides axially in mesh with a spline tooth formed on the respective first and second rotary shaft, and said first and second driving power gear mechanisms and said first and second recirculating power gear mechanisms each include a boss having a spline tooth engageable with an associated one of said sleeves, whereby sliding one of said sleeves and meshing it with the spline tooth of one of said bosses connects or disconnects an associated one of said shafts with an associated one of said gear mechanisms.

5. A continuous speed-shifting device as defined in claim 3, wherein the pulley clutch is provided with a cylindrical movable member having a certain spline tooth at its inner periphery and slidable in an axial direction, said certain spline tooth is engageable with a spline tooth formed at the main body part and at the sheave part, and by engaging the certain spline tooth with the spline tooth at the main body part and at the sheave part by sliding the movable member axially, connection and disconnection of the main body part and the sheave part are effected.

6. A continuous speed-shifting device as defined in claim 1, wherein the differential gear mechanism is composed of a planetary gear mechanism provided with a sun gear rotatably mounted on the third rotary shaft, a plurality of pinions to mesh with said sun gear, a pinion carrier supported by the third rotary shaft and carrying said pinions and a ring gear arranged at the outermost periphery and engageable with the pinions at the inner periphery thereof.

* * * * *